United States Patent
Andoniev et al.

[15] 3,692,103
[45] Sept. 19, 1972

[54] DEVICE FOR EVAPORATIVE COOLING OF METALLURGICAL FURNACES

[72] Inventors: Sergei Mikhailovich Andoniev, Dorina Borisovna Kutsykovich, Leonid Moiseevich Gerber, Gennady Alexandrovich Kudinov, Grigory Ivanovich Kasyanov, Tamara Izovna Nissenbaum, Jury Bortsovich Raikovsky, Kharkov; Mikhail Semenovich Somchenko, Oleg Vladimirovich Filipiev, Kharkov, all of U.S.S.R.

[73] Assignee: Vsesoyuzny Nauchono-Issledovatelsky i proektny Institut po Ochistke Tekhnologicheskikh gazov i stochnykh vod i isprizovaniju vtorichnykh onorgarosursov predpriyaty chernoi metallurgi, Kharkov, U.S.S.R.

[22] Filed: Nov. 3, 1970

[21] Appl. No.: 86,555

[52] U.S. Cl. .............. 165/105, 165/147, 165/169, 165/177, 263/44, 266/32
[51] Int. Cl. .................. C21b 7/10, F28j 13/08
[58] Field of Search ........ 266/32; 165/147, 169, 177, 165/105; 263/44

[56] References Cited

UNITED STATES PATENTS 2,671,658   3/1954   Moore .................. 165/147 X

FOREIGN PATENTS OR APPLICATIONS 521,103   3/1955   Italy ........................ 266/32

Primary Examiner—Robert D. Baldwin
Attorney—Holman & Stern

[57] ABSTRACT

A device for the evaporative cooling of metallurgical furnaces has vertically arranged members provided with pipes for passing a coolant and the pipes of the members arranged at a lower level being connected with the pipes of the members of a higher level by means of external pipes, with the cross section of the pipes of both types in each higher member being greater than that of the lower types.

2 Claims, 2 Drawing Figures

DEVICE FOR EVAPORATIVE COOLING OF METALLURGICAL FURNACES

BACKGROUND OF THE INVENTION

The present invention relates to metallurgy, and more particularly to devices for evaporative cooling of metallurgical furnaces, preferably blast furnaces.

PRIOR ART

Known in the art are devices for the evaporative cooling of blast furnaces, in which the members being cooled are combined into banks in accordance with circulation circuits, and are provided with means for the supply of water from below and for the discharge of the steam-water mixture from above, as well as with locking members for switching the bank over to service water. All of the cooled members accommodate pipes of the same cross-section which are combined vertically by means of connection pipes.

The disadvantage of the devices known heretofore resides in the discrepancy in the cooled members between the ever increasing volume of the steam-water mixture due to a partial steam formation and the diameter of the pipes which have the same cross-section along the height of the circulation circuit.

Such a discrepancy has an adverse effect on the reliability of cooling due to a reduction in the circulation consumption of the coolant and to a possibility of steam locks to be formed.

It is an object of the present invention to eliminate said disadvantage.

The specific object of the invention is to provide a device for the evaporative cooling of metallurgical furnaces which ensures a reliable circulation of the coolant and a high quality of cooling.

SUMMARY OF THE INVENTION

Such object is accomplished by the provision of a device for the evaporative cooling of metallurgical furnaces, particularly blast furnaces, which comprises banks of vertically arranged members to be cooled which accommodate pipes for passing a coolant, said pipes being interconnected vertically by means of external connection pipes constituting closed vertical circulation circuits, in which, according to the invention, the cross-section of the cooling and the connection pipes of each member to be cooled which is arranged at a higher level is greater than that of the similar pipes of the members disposed at a lower level.

DETAILED DESCRIPTION OF THE INVENTION

Figure 1:
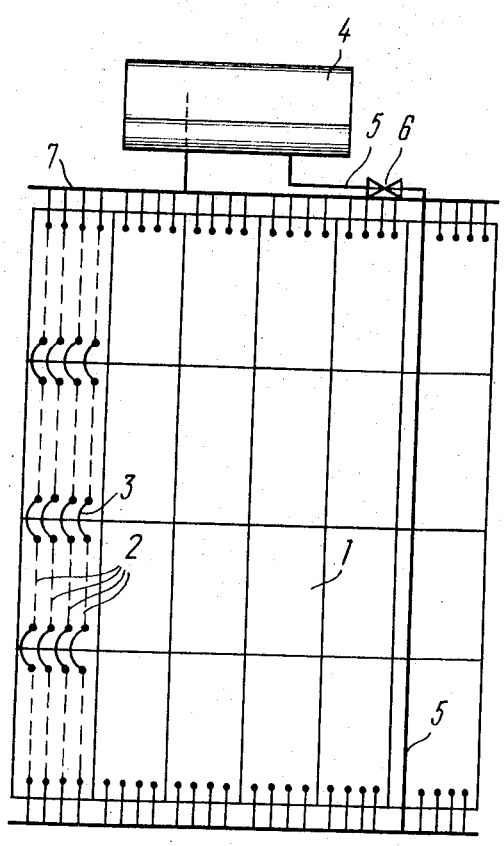
FIG. 1 is a diagrammatic view of the device for evaporative cooling, according to the invention.
Figure 2:
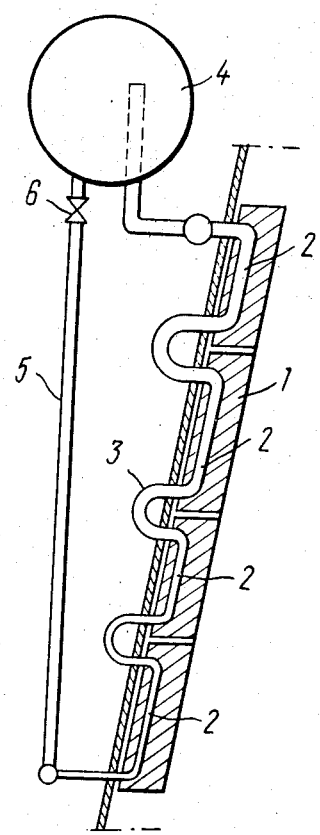
FIG. 2 is a view partly in elevation and partly in cross-section of the vertical bank of cooled members.

The present device for evaporative cooling comprises a group of members 1 to be cooled (FIGS. 1 and 2) with members being arranged in horizontal rows and being vertically aligned. Each member accommodates pipes 2 for the passage of a coolant. The cooling pipes of each member are combined along a vertical line with the assistance of external connection pipes 3 thus providing closed circulation circuits. Liquid to be evaporated is supplied to the pipes by means of delivery pipes 5 from a reservoir 4, with the delivery pipes 5 being provided with control valves 6. The liquid to be evaporated, for example, hot water, and whose temperature is brought close to the boiling point, is fed from the reservoir 4 via the delivery pipes 5 to the pipes 2 of the bottom horizontal row of the members 1 to be cooled. Then, in the course of heating, the water which passes through all the pipes of the vertical row of the members to be cooled, a steam-water mixture is formed in the pipes, with the mixture being the coolant. This mixture, via a system of discharge pipes 7 (FIG. 1) ascends into the reservoir 4. Since the thermal load to which the pipes are subjected is summed with an increase of the height of the location of the circulation circuit, and the volume of the steam-water mixture increases accordingly, the cooling pipes 2 and the connection pipes 3 of each member of a higher horizontal row have a cross-section greater than that of the similar pipes of the members of a lower horizontal row.

Such an embodiment of the pipes in the present device ensures a reliable circulation of the coolant in the circulation circuit under the conditions of an increase in the volume of steam and of the steam-water mixture with an increase in the height of the location of the circuit, thus increasing the reliability of operation of the entire device.

What is claimed is:

1. A device for the evaporative cooling of metallurgical furnaces, particularly blast furnaces, comprising horizontal rows of aligned members to be cooled, the members of the horizontal rows being aligned to provide vertical rows, vertical pipes for passing a coolant accommodated by each member, external pipes connecting the pipes of the cooling members of one horizontal row with the vertical pipes of the cooling members vertically aligned therewith in the horizontal row thereabove, the cross section of said external pipes and the vertical pipes of the members in the higher horizontal rows being greater than the cross section of the external pipes and the vertical pipes in the lower horizontal rows.

2. The evaporative cooling device as claimed in claim 1, including a reservoir for the coolant, delivery conduits between the reservoir and the vertical pipes of each member of the lowermost horizontal row, discharge conduits leading from the vertical pipes of each member of the uppermost horizontal row to the reservoir, and control valve means for the delivery conduits.

* * * * *